United States Patent [19]

Morishita et al.

[11] Patent Number: 4,985,608
[45] Date of Patent: Jan. 15, 1991

[54] METHOD OF POSITIONING A WIRE ELECTRODE AND A WORKPIECE RELATIVE TO EACH OTHER IN A WIRE CUT ELECTRIC DISCHARGE MACHINE

[75] Inventors: Hiroaki Morishita; Jun Aramaki, both of Aichi; Masao Tomisawa, Hyogo, all of Japan

[73] Assignee: Mitsubishi Denki Kabushiki Kaisha, Tokyo, Japan

[21] Appl. No.: 445,056

[22] Filed: Dec. 4, 1989

[30] Foreign Application Priority Data

Dec. 9, 1988 [JP] Japan .................................. 63-311552

[51] Int. Cl.⁵ .............................................. B23H 7/06
[52] U.S. Cl. .................................................. 219/69.12
[58] Field of Search ................. 219/69.12, 69.16, 69.17

[56] References Cited

U.S. PATENT DOCUMENTS

| | | | |
|---|---|---|---|
| 4,324,970 | 4/1982 | Nanasawa et al. | 219/69.12 |
| 4,622,450 | 11/1986 | Kinoshita et al. | 219/69.12 |
| 4,689,457 | 8/1987 | Izumiya et al. | 219/69.12 |
| 4,725,706 | 2/1988 | Inoue | 219/69.12 |
| 4,748,310 | 5/1988 | Aso et al. | 219/69.12 |

FOREIGN PATENT DOCUMENTS

| | | | |
|---|---|---|---|
| 104099 | 8/1979 | Japan | 219/69.12 |
| 61-121833 | 6/1986 | Japan . | |
| 62-207625 | 9/1987 | Japan . | |
| 139617 | 6/1988 | Japan | 219/69.12 |
| 191516 | 8/1988 | Japan | 219/69.12 |

*Primary Examiner*—Geoffrey S. Evans
*Attorney, Agent, or Firm*—Sughrue, Mion, Zinn, Macpeak & Seas

[57] ABSTRACT

In a method of positioning a wire electrode and a workpiece relative to each other in a wire cut electric discharge machine, the wire electrode is stopped under tension, the wire electrode and the workpiece are moved relative to each other, and when the wire electrode and the workpiece are brought into contact with each other, the relative movement is stopped to detect the relative position of the wire electrode and the workpiece, whereby the wire electrode and the workpiece can be positioned relative to each other with high accuracy and reproducibility.

2 Claims, 2 Drawing Sheets

METHOD OF POSITIONING A WIRE ELECTRODE AND A WORKPIECE RELATIVE TO EACH OTHER IN A WIRE CUT ELECTRIC DISCHARGE MACHINE

BACKGROUND OF THE INVENTION

This invention relates to a method of positioning a wire electrode and a workpiece relative to each other in a wire cut electric discharge machine.

A conventional wire cut electric discharge machine, as shown in FIG. 2, comprises: a wire bobbin 1; a wire electrode 2 supplied from the wire bobbin 1; a brake roller 3; a powder brake 4 coupled directly to the brake roller 3; an auxiliary pulley 5; an upper pulley 6; a lower pulley 7; a take-up roller 8; an electric motor 9 for driving the take-up roller 8; a tachometer generator 10 for detecting the speed of the motor 9; a pinch roller 11 operating with the take-up roller 8 to clamp the wire electrode 2; a spring 12 for pushing the pinch roller 11 against the take-up roller; a workpiece 13; a surface plate 14 for fixing the workpiece 13; a table 15 for fixing and moving the surface plate 14; a ball screw 16 for moving the table 15; a nut 17 for converting rotation of the ball screw 16 into straight displacement of the table 15; an electric motor 18 for driving the ball screw 16; and an encoder 19 for detecting the angle of rotation of the motor 18.

The electric discharge machine further comprises: an upper wire guide member 20 for supporting the wire electrode 2 above the workpiece 13; a lower wire guide member 21 for supporting the wire electrode 2 below the workpiece 13; a current supplying element 22 which is brought into contact with the wire electrode 2 to supply electric current to it; a contact detector 23 for detecting the contact of the wire electrode 2 and the workpiece 13; and a numerical control unit 24 for supplying instructions to the brake 4, the motor 9 and the motor 18. The brake roller 3, the powder brake 4, and the auxiliary pulley 5 form a wire electrode tensioning unit 40b. The take-up roller 8, the motor 9, the tachometer generator 10, the pinch roller 11, and the spring 12 form a wire electrode running unit 50. The table 15, the ball screw 16, the nut 17, the motor 18, and the encoder 19 form a relative movement unit 60 for moving the wire electrode 2 and the workpiece 13 relative to each other.

The electric discharge machine thus organized operates as follows:

The wire electrode 2 is supplied from the wire bobbin 1, and is tensioned suitably according to its diameter being wound on the brake roller 3. In this operation, in order to prevent the slip of the wire electrode 2 thereby to tension it suitably, the wire electrode is wound one turn on the auxiliary pulley 5, and is then wound on the brake roller 3. The wire electrode 2 is laid over the upper pulley 6 and is positioned in place by means of the upper and lower wire guide members 20 and 21, and then laid over the lower pulley 7. The wire electrode thus laid is taken up while being clamped by the take-up roller 8 and the pinch roller 11. In this operation, the pinch roller 11 is pushed against the take-up roller 8 by the spring 12, so that the pinch roller 11 and the take-up roller 8 rotate without slip. Thus the wire electrode 2 has been laid under tension along the wire electrode running path.

It is necessary for the wire cut electric discharge machine needs to detect the relative position of the wire electrode 2 and the workpiece 13 before operation. This will be described in more detail.

The wire electrode 2 is positioned by adjusting its speed and tension. The motor 9 coupled to the take-up roller 8 is driven under the control of the numerical control unit 24 to run the wire electrode 2. The wire electrode 2 is run at a constant speed by a feedback signal from the tachometer generator 10.

The tension of the wire electrode 2 is adjusted by the numerical control unit 24 controlling the powder brake 4. The powder brake 4 produces a braking force in proportion to the current supplied thereto, and therefore the tension applied to the wire electrode 2 is proportional to the current supplied to the powder brake. The powder brake 4 works only when the wire electrode 2 is run. Therefore, the wire electrode 2 is positioned while being run at a predetermined speed and under a predetermined tension. When an instruction of rotation is applied to the motor 18 by the numerical control unit 24, the table 15 is moved slowly to the left until the wire electrode 2 is brought into contact with the workpiece 13. Thereupon, the contact detector 23 supplies a detection signal to the numerical control unit 24, and the position of the table 15 is detected from the output signal of the encoder 19 and stored in the numerical control unit 24. Thus, the relative position of the wire electrode 2 and the left end face of the workpiece 13 has been acknowledged.

The conventional method of positioning a wire electrode relative to a workpiece in a wire cut electric discharge machine is as described above. Therefore, the positioning operation cannot be achieved without running the wire electrode. When being run in this manner, the wire electrode is slightly oscillated, which decreases the accuracy and reproducibility in positioning the wire electrode relative to the workpiece.

SUMMARY OF THE INVENTION

Accordingly, an object of this invention is to eliminate the above-described difficulties accompanying a conventional method of positioning a wire electrode relative to a workpiece in a wire cut electric discharge machine.

More specifically, an object of the invention is to provide a method of positioning a wire electrode and a workpiece relative to each other in a wire cut electric discharge machine in which the wire electrode and the workpiece can be positioned relative to each other with high accuracy and reproducibility.

The foregoing object and other objects of the invention have been achieved by the provision of a method of positioning a wire electrode relative to a workpiece in wire cut electric discharge machine which comprises the steps of: stopping the wire under tension; moving the wire electrode and the workpiece relative to each other; and suspending the relative movement of the wire electrode and workpiece when the wire electrode and the workpiece are brought into contact with each other to detect the relative position of the wire electrode and the workpiece.

That is, in the method of the invention, the wire electrode stopped under suitable tension and the workpiece are brought into contact with each other to detect the relative position of the wire electrode and the workpiece.

The nature, principle and utility of the invention will become apparent from the following detailed description when read in conjunction with the accompanying drawings, in which like parts are designated by like reference numerals or characters.

DETAILED DESCRIPTION OF THE PREFERRED EMBODIMENT

One example of a method of positioning a wire electrode and a workpiece relative to each other in a wire cut electric discharge machine will be described with reference to FIG. 1.

Figure 1:
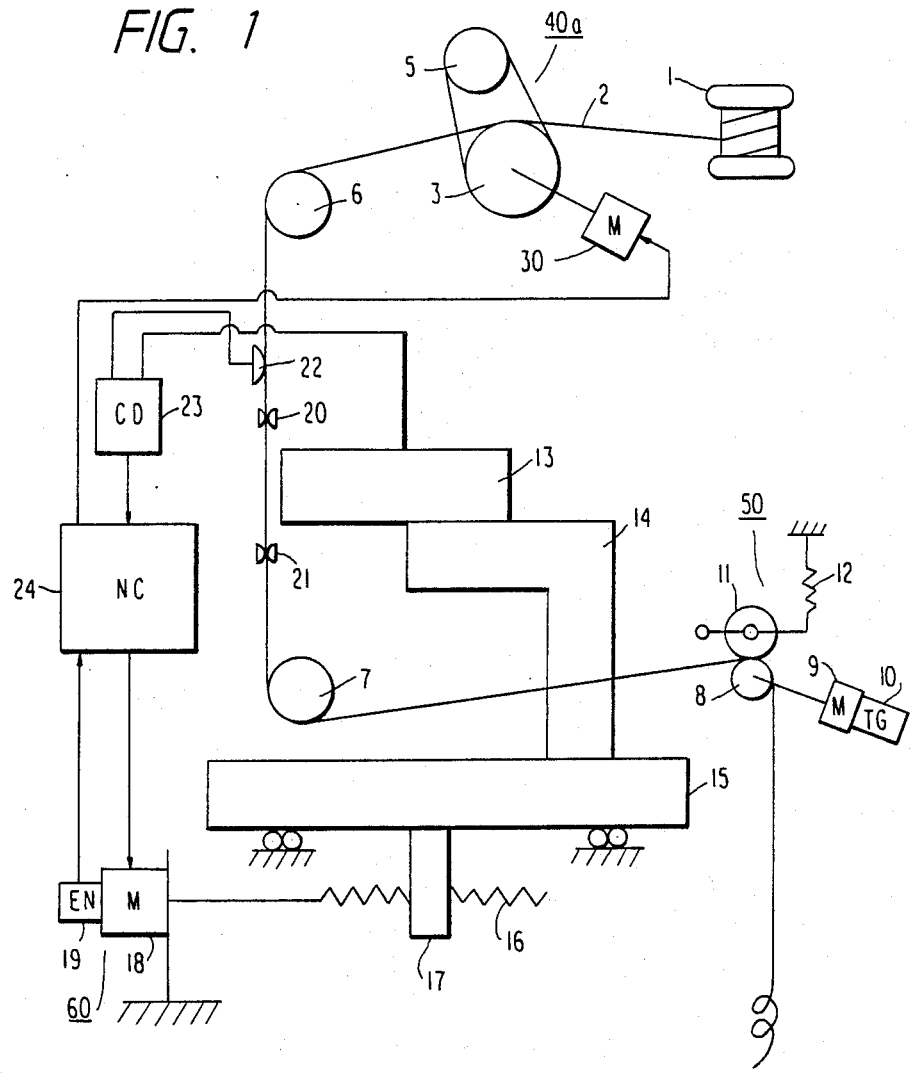
FIG. 1 , is an explanatory diagram, partly as a block diagram, showing a wire cut electric discharge machine operating according to a method of positioning a wire electrode and a workpiece relative to each other according to this invention.
Figure 2:
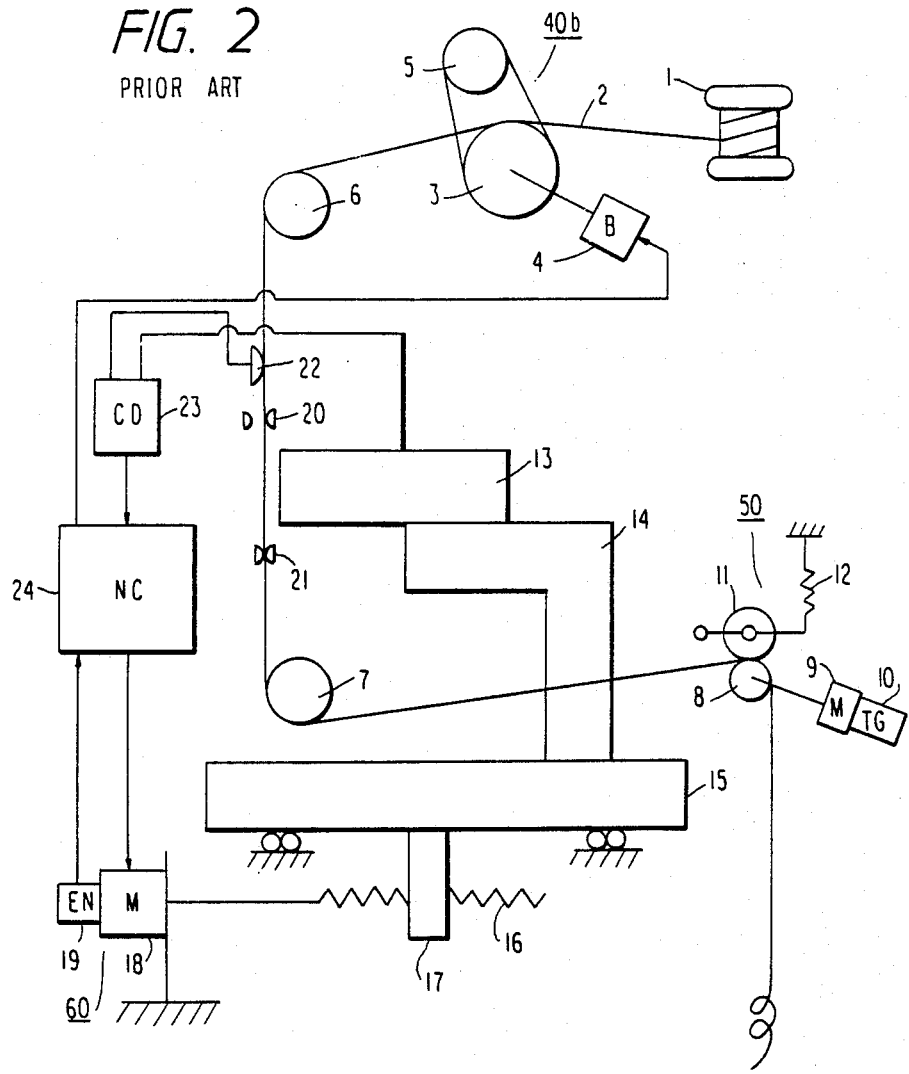
FIG. 2 is an explanatory diagram, partly as a block diagram, showing an example of a conventional wire cut electric discharge machine.

In FIG. 1, those components which have been already described with reference to FIG. 2 are therefore designated by the same reference numerals or characters. Further in FIG. 2, reference character 30 designates a DC motor; and 40a, a wire electrode tensioning unit comprising the brake roller 3, the auxiliary pulley 5, and the DC motor 30.

The wire cut electric discharge machine thus constructed operates as follows: Its wire electrode running path is the same as that in the conventional wire cut electric discharge machine described above The wire electrode 2 is tensioned by utilization of the fact that a DC motor 30 produces torque in proportion to current supplied thereto; that is, the wire electrode 2 is tensioned by controlling the current of the DC motor 30 with the numerical control unit 24. Since the DC motor is used to tension the wire electrode 2, even if the speed of the wire electrode is reduced to zero, the wire electrode 2 can be tensioned. Therefore, with the speed of the wire electrode 2 set to zero, the wire electrode 2 is positioned relative to the workpiece 13 in the same manner as in the conventional wire cut electric discharge machine described before.

As was described above, in the method of the invention, the wire electrode 2 is positioned relative to the workpiece 13 after being stopped and tensioned Therefore, the wire electrode is not oscillated during positioning, so that the wire electrode 2 can be positioned relative to the workpiece 13 with high accuracy and reproducibility.

While there has been described in connection with the preferred embodiment of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A method of positioning a wire electrode, which is fed from a supply source, relative to a workpiece in a wire cut electric discharge machine which comprises the steps of:

stopping under tension said feeding of said wire electrode;

relatively moving said stopped wire electrode and said workpiece with respect to each other; and suspending said relative movement of said stopped wire electrode and workpiece when said stopped wire electrode and said workpiece are brought into contact with each other to detect a relative position of said wire electrode and said workpiece.

2. A method according to claim 1, in which said wire electrode is tensioned by controlling the current of a dc motor with a numerical control unit.

* * * * *